US012763632B2

(12) United States Patent
Wang et al.

(10) Patent No.: US 12,763,632 B2
(45) Date of Patent: Oct. 13, 2026

(54) COOLING JACKET AND MOTOR

(71) Applicant: Schaeffler Technologies AG & Co. KG, Herzogenaurach (DE)

(72) Inventors: Kun Wang, Shanghai (CN); Jiancheng Huang, Shanghai (CN); Liang Hu, Shanghai (CN); Weigan Liu, Suzhou (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 291 days.

(21) Appl. No.: 18/019,555

(22) PCT Filed: Aug. 31, 2020

(86) PCT No.: PCT/CN2020/112531

§ 371 (c)(1),
(2) Date: Feb. 3, 2023

(87) PCT Pub. No.: WO2022/041211

PCT Pub. Date: Mar. 3, 2022

(65) Prior Publication Data

US 2023/0336048 A1 Oct. 19, 2023

(51) Int. Cl.
*H02K 5/20* (2006.01)

(52) U.S. Cl.
CPC .................................... *H02K 5/203* (2021.01)

(58) Field of Classification Search
CPC ............ H02K 1/20; H02K 5/20; H02K 5/203; H02K 9/19; H02K 9/193; H02K 9/197
See application file for complete search history.

(56) References Cited

U.S. PATENT DOCUMENTS

| | | | | |
|---|---|---|---|---|
| 2009/0009013 A1* | 1/2009 | Baumann | H02K 5/203 310/54 |
| 2013/0126143 A1 | 5/2013 | Sheu et al. | |
| 2014/0246177 A1* | 9/2014 | Chamberlin | H02K 5/203 165/104.33 |
| 2015/0308456 A1* | 10/2015 | Thompson | F04D 17/12 417/244 |

FOREIGN PATENT DOCUMENTS

| | | | |
|---|---|---|---|
| CN | 101340120 A | 1/2009 | |
| CN | 104037983 A | 9/2014 | |
| CN | 108377056 A | 8/2018 | |
| CN | 208508717 U | 2/2019 | |
| CN | 109510401 A | 3/2019 | |
| CN | 109980836 A * | 7/2019 | H02K 5/20 |

OTHER PUBLICATIONS

Mi (CN 109980836 A) English Translation (Year: 2019).*

* cited by examiner

*Primary Examiner* — Tulsidas C Patel
*Assistant Examiner* — Robert E Mates
(74) *Attorney, Agent, or Firm* — Volpe Koenig

(57) ABSTRACT

A cooling jacket, which is cylindrical and has an axial direction and a radial direction. The outer peripheral wall of the cooling jacket is partially recessed to form a channel allowing a cooling fluid to pass, wherein the channel comprises a plurality of straight sections and a plurality of inclined sections, the extending direction of the straight section is perpendicular to the axial direction, the inclined sections are connected to the straight sections to change the direction of the channel, and at least some straight sections connected to two ends of the inclined sections are used for circulating the cooling liquid in opposite directions.

17 Claims, 3 Drawing Sheets

COOLING JACKET AND MOTOR

TECHNICAL FIELD

The present disclosure relates to the field of cooling jackets, in particular to a cooling jacket for a motor, and a motor comprising the cooling jacket.

BACKGROUND

Generally, a cooling jacket can be integrated on a motor housing in order to dissipate heat from a motor. The cooling jacket is typically in interference fit with a stator of the motor inside the cooling jacket, and the heat (for example, most of iron loss and copper loss) generated inside the motor can be transferred from the stator to the cooling jacket by means of the direct contact of metal parts. A peripheral wall of the cooling jacket defines a channel allowing a cooling fluid to flow therethrough, and the cooling jacket can be cooled by circularly pumping the cooling fluid to flow through the channel.

FIG. 1 shows a possible cooling jacket and a schematic direction of a channel 1 arranged thereon. The cooling jacket is cylindrical, and the channel 1 extends spirally from one end to the other end of an outer peripheral wall of the cooling jacket in an axial direction. The cooling fluid flows into the channel from a start end 1*a* of the channel 1 under pressure provided by an external pump, flows out of the cooling jacket upon flowing to a stop end 1*b* along the channel, and then is recirculated under the action of the pump. The hollow arrows in the figure show a circulating direction of the cooling fluid.

However, the spiral direction of the channel 1 makes it impossible for some areas on the cooling jacket to be covered by the channel 1, as shown by the dashed boxes in the figure, and these areas may accumulate too much heat, thereby reaching an excessively high temperature, due to lack of timely cooling. The high temperature in the above-mentioned heat accumulation areas may affect the control over the motor by a power electronic unit (PEU), leading to limiting of the operating power of the motor; and the local excessively high temperature will also accelerate aging of a sealing ring located between the cooling jacket and the motor housing, thereby affecting sealing performance.

FIG. 2 shows another possible cooling jacket and a schematic direction of a channel 1 arranged thereon. In the present scheme, instead of extending spirally, the channel 1 roughly surrounds the cooling jacket by one circumference in the circumferential direction and then offsets a distance equivalent to the width of one channel along an inclined section, and then a circle of new circular channel starts, such that the channel extends from the start end 1*a* to the stop end 1*b* circularly.

Although the present scheme allows the channel 1 to cover most of the peripheral wall of the cooling jacket, due to the turning of the channel, there are areas where the cooling fluid is not easy to flow or even still nearby the start end 1*a* and the stop end 1*b*, as shown in the dashed boxes in FIG. 2. Heat will still be accumulated in these areas.

In addition, the start end 1*a* and the stop end 1*b* of the channel 1 shown in FIGS. 1 and 2 are both located at two different ends in the axial direction of the cooling jacket. For the case where there are special design requirements for the interior of the motor or a vehicle for which it is desired that the start end 1*a* and the stop end 1*b* are located at the same end in the axial direction of the cooling jacket, neither of the above two schemes can meet the requirements.

SUMMARY

The present disclosure aims to overcome or at least alleviate the foregoing deficiency of the prior art, and provides a cooling jacket and a motor.

In the first aspect according to the present disclosure, the present disclosure provides a cooling jacket being cylindrical and having an axial direction and a radial direction, with an outer peripheral wall of the cooling jacket being partially recessed to form a channel allowing a cooling fluid to pass, wherein

- the channel comprises a plurality of straight sections and a plurality of inclined sections,
- the extending directions of the straight sections are perpendicular to the axial direction, the inclined sections are connected to the straight sections to change the direction of the channel, and
- two of the straight sections connected to two ends of at least part of the inclined sections are used for circulating the cooling fluid in opposite directions.

In at least one embodiment, the extending directions of the inclined sections are not perpendicular to both the axial direction and the extending directions of the straight sections.

In at least one embodiment, the extending directions of all the inclined sections are parallel to each other.

In at least one embodiment, the channel has a start end and a stop end, and the cooling fluid can flow from the start end to the stop end along the channel and traverse the channel.

In at least one embodiment, the start end and the stop end are aligned in the axial direction.

In at least one embodiment, rounded corners are formed at the start end and the stop end of the channel.

In at least one embodiment, rounded corners are formed at the portions where the straight sections are connected to the inclined sections.

In at least one embodiment, the channel includes at least two sub-channels connected in parallel on a circulating path.

In at least one embodiment, the directions of the sub-channels connected in parallel on the entire circulating path are not completely the same.

In at least one embodiment, one of the sub-channels partially surrounds the other one of the sub-channels in part of sections on the circulating path.

In at least one embodiment, the channel has a start end and a stop end, and the cooling fluid can flow from the start end to the stop end along the channel and traverse each of the sub-channels.

In at least one embodiment, the sub-channels connected in parallel and located at the start end are parallel to each other, and the sub-channels connected in parallel and located at the stop end are parallel to each other.

In at least one embodiment, cross-sectional areas of the channel in the direction perpendicular to the circulating direction are not completely equal.

In at least one embodiment, cross-sectional areas of the channel in the direction perpendicular to the circulating direction are not completely equal, and cross-sectional areas of the sub-channels connected in parallel at a same cross section on the circulating path are equal.

In the second aspect according to the present disclosure, the present disclosure provides a motor, comprising a rotor and a stator, characterized in that, the motor further comprises a cooling jacket according to the present disclosure, and the rotor and the stator are arranged on an inner periphery of the cooling jacket.

The cooling jacket according to the present disclosure has a good heat dissipation effect, and the motor according to the present disclosure has the same advantage.

DETAILED DESCRIPTION

Figure 1:
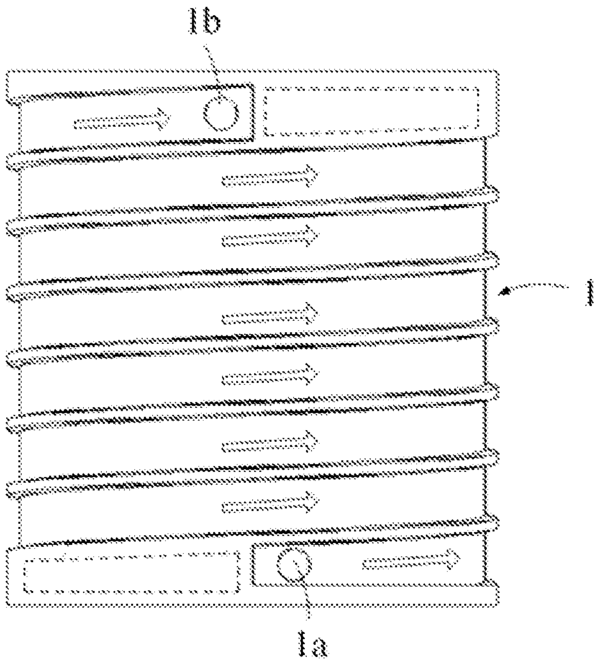
FIG. 1 Prior Art
FIG. 1 is a schematic diagram of a possible cooling jacket.
Figure 2:
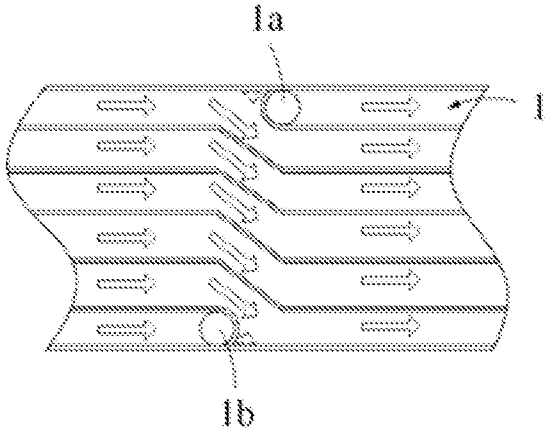
FIG. 2 Prior Art
FIG. 2 is a schematic diagram of part of a channel of another possible cooling jacket.

Exemplary embodiments of the present disclosure will be described below with reference to the drawings. It should be understood that the specific description is only used to teach those skilled in the art how to implement the present disclosure, and is neither intended to be exhaustive of all possible variations of the present disclosure nor to limit the scope of the present disclosure.

Unless otherwise specified, with reference to FIGS. 3 to 6, A denotes an axial direction of a cooling jacket, and the axial direction A is consistent with an axial direction of a motor; and R denotes a radial direction of the cooling jacket, and the radial direction R is consistent with a radial direction of the motor.

First Embodiment

First of all, a cooling jacket according to the first embodiment of the present disclosure is described with reference to FIG. 3.

The cooling jacket is cylindrical, an inner peripheral portion of the cooling jacket is used to accommodate a rotor and a stator of a motor, and an outer periphery of the cooling jacket is used to sleeve a motor housing. An outer peripheral wall of the cooling jacket is partially recessed toward a radial inner side to form a channel 10 allowing a cooling fluid to flow.

The channel 10 comprises a plurality of straight sections and a plurality of inclined sections.

The straight sections extend in a circumferential direction of the cooling jacket, or in other words, the extending directions of the straight sections are perpendicular to an axial direction A.

Each straight section is connected, when extending in the circumferential direction by less than one circle, to one inclined section, and the inclined sections guide the channel 10 to different areas in the axial direction A. The inclined sections extend along a cylindrical spiral, and an extending distance of each inclined section on the outer periphery of the cooling jacket is less than one circle. Preferably, in order to make the channel 10 cover areas on a peripheral wall of the cooling jacket as much as possible, the extending directions of all the inclined sections are parallel to each other.

The straight sections and the inclined sections are arranged alternately, so that the channel 10 spirals around the outer periphery of the cooling jacket in a serpentine manner.

The two straight sections connected to two ends of part of the inclined sections are in opposite directions, so that the fluid circulates in the two straight sections in the opposite directions. For example, the straight section 112 and the straight section 114 connected to the inclined section 113 in FIG. 3 are adjacent and in the opposite directions.

After the channel 10 spirals from one end to the other end in the axial direction A in the serpentine manner, the inclined sections will guide the channel 10 to reversely spiral toward the start end, so that the start end 10*a* and the stop end 10*b* of the channel 10 are located at the same end in the axial direction A of the cooling jacket, thereby adapting to an arrangement of the circulating path outside the cooling jacket.

It should be understood that, in addition to the scheme in which the start end 10*a* and the stop end 10*b* are both located at the axial ends of the cooling jacket as shown in the figure, the start end 10*a* and the stop end 10*b* can also be aligned in the axial direction A but not located at the axial ends, for example, with both located at an axial middle portion, according to different design requirements of the circulating path outside the cooling jacket. In addition, since the channel 10 can not only spiral from one axial end to the other axial end, but also spiral from the other axial end to the one axial end, the start end 10*a* and the stop end 10*b* can also be displaced in the axial direction A and not located at the two axial ends as required.

In the present embodiment, the channel 10 comprises two sub-channels connected in parallel on the circulating path, and the two sub-channels run from the start end 10*a* to the stop end 10*b* in partially same direction (i.e., parallel) and partially different directions (i.e., non-parallel). The hollow arrows and shaded arrows in the figure indicate the directions of the two sub-channels, respectively.

Figure 3:
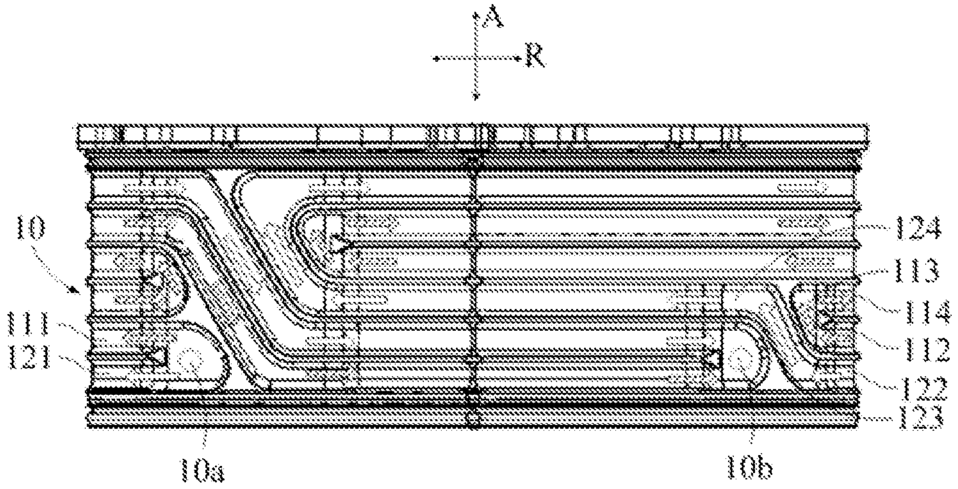
FIG. 3 is a schematic diagram of a cooling jacket according to a first embodiment of the present disclosure.

For example, two sub-channels are branched out from the start end 10*a* in FIG. 3, forming a straight section 111 and a straight section 121, respectively. It should be understood that the straight section 111 and the straight section 112 in the figure are actually the same straight section, and the straight section 121 and the straight section 122 are actually the same straight section.

The two sub-channels are the same in initial direction, that is, a section formed by the straight section 111 (i.e., the straight section 112) and the inclined section 113 is arranged parallel to a section formed by the straight section 121 (i.e., the straight section 122) and the inclined section 123.

However, the two sub-channels are in different directions, following the inclined section 113 and the inclined section 123.

In the section connected to the stop end 10*b*, the above two sub-channels are in the same direction again.

The sub-channels connected in parallel are in partially different directions, so that one sub-channel partially surrounds the other sub-channel. For example, the sub-channel following the inclined section 123 in FIG. 3 partially surrounds an outer periphery of the other sub-channel parallel thereto.

In conclusion, the two straight sections connected by the inclined section can change a surrounding direction, which makes the channel able to spiral from one end to the other end in the axial direction A in the manner that the straight section surrounds by less than one entire circle in the circumferential direction, and then reversely spiral back from the other end; and the two sub-channels that are connected in parallel and are not completely in the same direction allow the number of direction changes of the channel during spiraling to decrease, so that the kinetic energy loss and the pressure loss of the fluid during direction changes are small.

Preferably, when the direction of the channel 10 is changed each time, rounded corners are formed between the straight sections and the inclined sections, so as to reduce a pressure drop of the cooling fluid during the direction change.

Preferably, rounded corners are formed at both the start end 10*a* and the stop end 10*b* of the channel 10.

With reference to FIG. 3, in the section of the channel from the straight section 122-> the inclined section 123-> the straight section 124, the straight section 122 and the straight section 124 are spaced apart by the width of one channel, and the circulating direction of the cooling fluid is not reversed (only turned rather than reversed). An angle between the straight section 122 and the inclined section 123 is greater than 90°, and an angle between the inclined section 123 and the straight section 124 is also greater than 90°, which reduces the flow resistance. In other words, there is a portion in the channel in which one inclined section allows the two straight sections connected by the inclined section to be spaced apart by a width of one or more channels in the axial direction A, and in which the circulating direction of the cooling fluid is not reversed.

The straight section 112 is connected to the straight section 114 via the inclined section 113, the straight section 112 and the straight section 114 are adjacent and are reverse in the circulating direction of the cooling fluid, an angle between the straight section 112 and the inclined section 113 is greater than 90°, an angle between the inclined section 113 and the straight section 114 is less than 90°, and the straight section 112 is located upstream of the straight section 114. In other words, there is a section in the channel in which one inclined section allows the two straight sections connected by the inclined section to be adjacent or spaced apart by the width of a plurality of channels in the axial direction A, and in this section, the circulating direction of the cooling fluid is reversed, that is, turned by 180°, one of two corners formed at the two ends of the inclined section is an obtuse angle, the other one of the two corners is an acute angle, and the obtuse angle is located upstream of the acute angle, which reduces the flow resistance.

Second Embodiment

Next, a cooling jacket according to the second embodiment of the present disclosure will be described with reference to FIGS. 4 and 5. The present embodiment is a modification of the first embodiment, and the description of the same portions as the first embodiment is omitted. It should be understood that FIGS. 4 and 5 only schematically show the direction of the channel 10 and are not intended to limit a specific structure of the channel 10, for example, the channel 10 preferably has rounded corners at direction change positions and the ends.

In the present embodiment, in different areas on the circulating path, the cross-sectional areas of the channel 10 in the direction perpendicular to the circulating direction are not completely equal. Preferably, the cross-sectional areas of the sub-channels connected in parallel at a same cross section on the circulating path are equal, so as to avoid the phenomenon whereby different pressures within the sub-channels connected in parallel enable the fluid to tend to flow toward the sub-channels with lower pressures.

Figure 4:
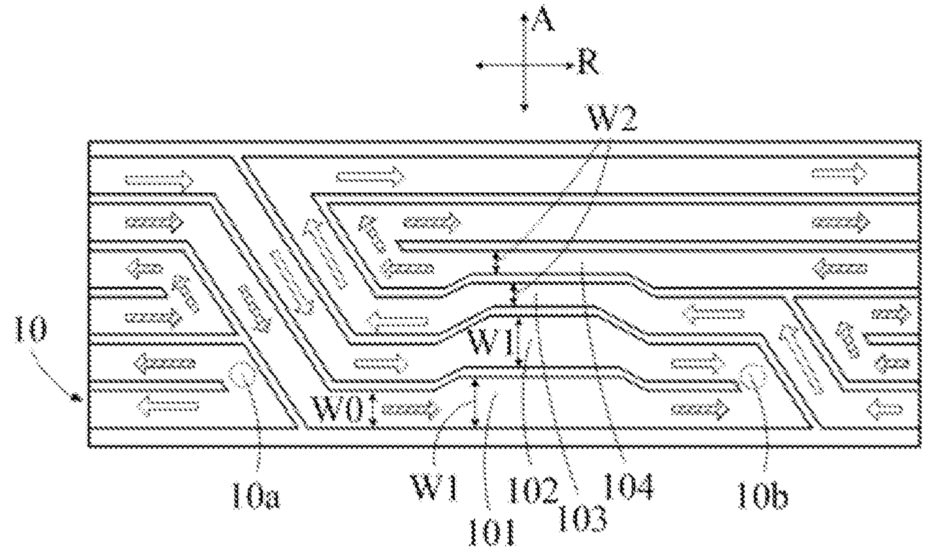
FIGS. 4 and 5 are schematic diagrams of two different channels of a cooling jacket according to a second embodiment of the present disclosure.

With reference to FIG. 4, a main section of the sub-channels of the channel 10 has a cross-sectional width W0, the sub-channels have a cross-sectional width W1 at the section 101 and the section 102, the sub-channels have a cross-sectional width W2 at the section 103 and the section 104, and W1>W0>W2. In other words, the cross-sectional area at the section 101 and the section 102 is greater than that at the section 103 and the section 104.

According to the Bernoulli equation of fluid mechanics, in the case of the same flow rate, the smaller the cross-sectional areas of the channel are, the higher the flow velocity is. Therefore, the cooling jacket can dissipate heat faster in the areas of the channel with smaller cross-sectional areas. That is, the heat in the areas of the cooling jacket covered by the section 103 and the section 104 in FIG. 4 will be carried away faster by the cooling fluid.

The design of unequal heat dissipation speeds in different areas on the surface of the cooling jacket is especially suitable for the phenomenon of uneven heat generation inside the motor.

It should be understood that, in addition to the manner of increasing the cross-sectional areas of the sub-channels in part of sections and decreasing the cross-sectional areas of the sub-channels in another part of the sections as shown in FIG. 4, the change of the cross-sectional areas of the channel may also only decrease the cross-sectional areas of the sub-channels in part of sections, or only increase the cross-sectional areas of the sub-channels in part of sections.

Figure 5:
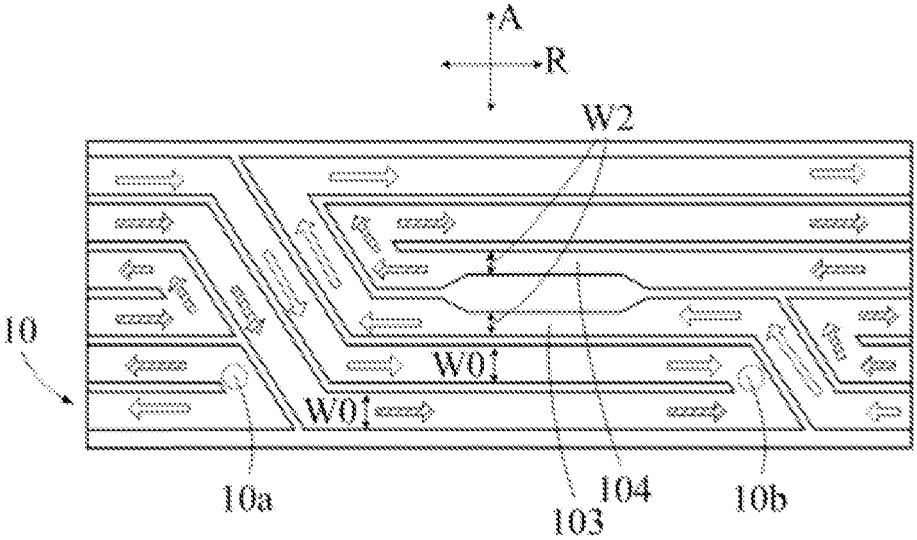

FIG. 5 shows the manner of only decreasing the cross-sectional areas of the sub-channels in part of sections, the main section of the sub-channels of the channel 10 in FIG. has a cross-sectional width W0, the sub-channels have a cross-sectional width W2 at the section 103 and the section 104, and W0>W2.

Third Embodiment

Figure 6:
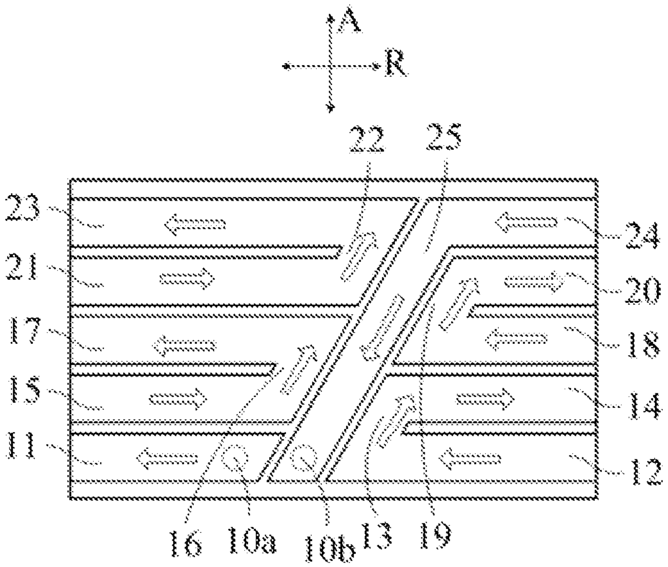
FIG. 6 is a schematic diagram of a channel of a cooling jacket according to a third embodiment of the present disclosure.

Next, a cooling jacket according to the third embodiment of the present disclosure is described with reference to FIG. 6. The present embodiment is a modification of the first embodiment, and the description of the portions that are the same as the first embodiment is omitted. It should be understood that FIG. 6 only schematically shows the direction of the channel 10 and is not intended to limit a specific structure of the channel 10, for example, the channel 10 preferably has rounded corners at direction change positions and the ends.

In the present embodiment, the channel 10 is not provided with sub-channels connected in parallel, but is a single channel running through the start end 10*a* and the stop end 10*b*. With regard to the channel 10 shown in FIG. 6, its circulating path is sequentially from a section 11, a section 12, a section 13, a section 14, a section 15, a section 16, a section 17, a section 18, a section 19, a section 20, a section 21, a section 22, a section 23, a section 24 to a section 25.

Since the straight sections connected to two ends of each inclined section are in opposite directions, the straight sections are not connected end to end on each circumference around the cooling jacket, which provides a space for the stop end 10*b* to return to the axial position where the start end 10*a* is located, so that the start end 10*a* and the stop end 10*b* of the channel 10 are located at the same end in the axial direction A of the cooling jacket.

It should be understood that the above-mentioned embodiments, especially the second embodiment and the third embodiment and some aspects or features thereof, may be properly combined.

It should be understood that the present disclosure further provides a motor comprising the above-mentioned cooling jacket.

Some of the beneficial effects of the above embodiments of the present disclosure are briefly described hereinafter.

(i) The start end 10*a* and the stop end 10*b* of the channel 10 of the cooling jacket according to the present disclosure can be located at the same position or any different positions in the axial direction A of the cooling jacket that can adapt to different interior space designs of different models of vehicles.

(ii) The channel 10 of the cooling jacket according to the present disclosure can basically cover the entire outer periphery of the cooling jacket, and there is no area where the cooling fluid remains still, so that the cooling jacket has good heat dissipation performance.

(iii) The cross-sectional areas of the channel 10 of the cooling jacket according to the present disclosure are adjustable, and the different cross-sectional areas of the channel can be designed according to different heating speeds of different areas on the surface of the cooling jacket, so that the cooling jacket can dissipate heat more effectively.

(iv) The channel 10 of the cooling jacket according to the present disclosure can be formed by two or more sub-channels connected in parallel, and the directions of these sub-channels are not exactly the same on the circulating path, so that the number of times of direction changes of the channel 10 is small, and the cooling fluid has a small pressure drop during circulating along the channel 10.

(v) The channel 10 of the cooling jacket according to the present disclosure is designed to be rounded corners at the ends and the direction change positions, so that the cooling fluid has the small pressure drop during circulating along the channel 10, and an area where the cooling fluid remains still is not prone to forming.

It should be understood that the foregoing embodiments are exemplary only and are not intended to limit the present disclosure. Those skilled in the art can make various modifications and changes to the foregoing embodiments according to the teaching of the present disclosure without departing from the scope of the present disclosure. For example, the channel of the cooling jacket according to the present disclosure may be only a part of a certain whole channel, and the channel of this part can be connected to other forms of channels to form the whole channel of the cooling jacket.

The invention claimed is:

1. A cooling jacket comprising: a cylindrical body having an axial direction and a radial direction, an outer peripheral wall partially recessed to form a channel allowing a cooling fluid to pass therethrough, wherein the channel comprises a plurality of straight sections and a plurality of inclined sections, extending directions of the straight sections are perpendicular to the axial direction, the inclined sections extend along a cylindrical spiral and are connected to the straight sections to change a direction of the channel, and two of the straight sections connected to two ends of at least part of the inclined sections are used for circulating the cooling fluid in opposite directions, wherein the channel comprises at least two sub-channels connected in parallel on a circulating path between a start end and a stop end, and wherein the sub-channels have a first cross-sectional width in a first section and a second cross-sectional width in a second section, the first cross-sectional width being greater than the second cross-sectional width, and the first section of a first subchannel is axially adjacent and coextensive with the second section of the first subchannel in a circumferential direction in the two straight sections connected to two ends of at least part of the inclined sections configured for circulating the cooling fluid in opposite directions.

2. The cooling jacket according to claim 1, wherein extending directions of the inclined sections are not perpendicular to both the axial direction and the extending directions of the straight sections.

3. The cooling jacket according to claim 1, wherein the extending directions of all the inclined sections are parallel to each other.

4. The cooling jacket according to claim 1, wherein the start end and the stop end are aligned in the axial direction.

5. The cooling jacket according to claim 1, wherein rounded corners are formed both at the start end and the stop end of the channel.

6. The cooling jacket according to claim 1, wherein rounded corners are formed at portions where the straight sections are connected to the inclined sections.

7. The cooling jacket according to claim 1, wherein directions of the sub-channels connected in parallel on the entire circulating path are not completely the same.

8. The cooling jacket according to claim 7, wherein one of the sub-channels partially surrounds the other one of the sub-channels in part of sections on the circulating path.

9. The cooling jacket according to claim 1, wherein the cooling fluid can flow from the start end to the stop end along the channel and traverse each of the sub-channels.

10. The cooling jacket according to claim 9, wherein the sub-channels connected in parallel at the start end are parallel to each other, and the sub-channels connected in parallel at the stop end are parallel to each other.

11. The cooling jacket according to claim 1, wherein cross-sectional areas of the channel in a direction perpendicular to a circulating direction are not completely equal.

12. The cooling jacket according to claim 11, wherein the cross-sectional areas of the channel in the direction perpendicular to the circulating direction are not completely equal, and cross-sectional areas of the sub-channels connected in parallel at a same cross section on the circulating path are equal.

13. The cooling jacket according to claim 1, wherein an extending distance of each inclined section on the outer peripheral wall of the cooling jacket is less than one circle.

14. The cooling jacket according to claim 13, wherein a main section of the first subchannel has a cross-sectional width that is between the first cross-sectional width in a first section and the second cross-sectional width in a second section.

15. A motor, comprising a rotor and a stator, and a cooling jacket, the rotor and the stator being arranged on an inner periphery of the cooling jacket wherein the cooling jacket includes an outer peripheral wall partially recessed to form a channel allowing a cooling fluid to pass therethrough, the channel comprising: a plurality of straight sections and a plurality of inclined sections; the straight sections having extending directions perpendicular to an axial direction; the inclined sections extending along a cylindrical spiral and being connected to the straight sections to change a direction of the channel; and two of the straight sections connected to two ends of at least part of the inclined sections configured for circulating the cooling fluid in opposite directions, wherein the channel comprises at least two sub-channels connected in parallel on a circulating path between a start end and a stop end, and wherein the sub-channels have a first cross-sectional width in a first section and a second cross-sectional width in a second section, the first cross-sectional width being greater than the second cross-sectional width, and the first section of a first subchannel is axially adjacent and coextensive with the second section of the first subchannel in a circumferential direction in the two straight sections connected to two ends of at least part of the inclined sections configured for circulating the cooling fluid in opposite directions.

16. The motor according to claim 15, wherein an extending distance of each inclined section on the outer peripheral wall of the cooling jacket is less than one circle.

17. The motor according to claim 16, wherein a main section of the first subchannel has a cross-sectional width that is between the first cross-sectional width in a first section and the second cross-sectional width in a second section.

* * * * *